United States Patent [19]

Sakamoto et al.

[11] Patent Number: 5,235,436
[45] Date of Patent: Aug. 10, 1993

[54] IMAGE PROCESSING APPARATUS

[75] Inventors: Masahiro Sakamoto, Tokyo; Yasuhide Ueno, Fuchu; Mamoru Osada, Yokohama; Junnosuke Kataoka, Tokyo, all of Japan

[73] Assignee: Canon Kabushiki Kaisha, Tokyo, Japan

[21] Appl. No.: 663,435

[22] Filed: Mar. 1, 1991

[30] Foreign Application Priority Data

Mar. 2, 1990 [JP] Japan .................. 2-51172
Mar. 2, 1990 [JP] Japan .................. 2-51173

[51] Int. Cl.$^5$ ............................................. H04N 1/40
[52] U.S. Cl. ...................... 358/462; 358/452; 358/467; 382/9
[58] Field of Search .......... 358/400, 401, 404, 407, 358/429, 452, 453, 458, 462, 464, 465, 466, 467, 461, 428; 382/55, 9

[56] References Cited

U.S. PATENT DOCUMENTS 4,782,399 11/1988 Sato ........................ 358/443
5,008,752 4/1991 Van Nostrand .......... 358/462

FOREIGN PATENT DOCUMENTS

| 0158155A3 | 10/1985 | European Pat. Off. |
| 3522707A1 | 1/1986 | Fed. Rep. of Germany. |
| 58-12472A | 1/1983 | Japan .................. 358/467 |
| 58-105664A | 6/1983 | Japan .................. 358/462 |
| 2102240A | 1/1983 | United Kingdom. |
| 2162717A | 2/1986 | United Kingdom. |

Primary Examiner—Edward L. Coles, Sr.
Assistant Examiner—Jerome Grant, II
Attorney, Agent, or Firm—Fitzpatrick, Cella, Harper & Scinto

[57] ABSTRACT

In an image processing apparatus, comprising: image data sent from a transmission-side apparatus is received, and discrimination is performed as to whether the image data received is a character image or a halftone image segmentation processing is then performed on the reception data. When the discrimination means discrimitaes that the received image data is a character image, interpolation processing is performed on the basis of reception image data in a predetermined area, to perform segmentation processing of image data of a pixel of interest, and so the apparatus can perform segmentation processing of input data by simple control at high speed and low cost.

23 Claims, 12 Drawing Sheets

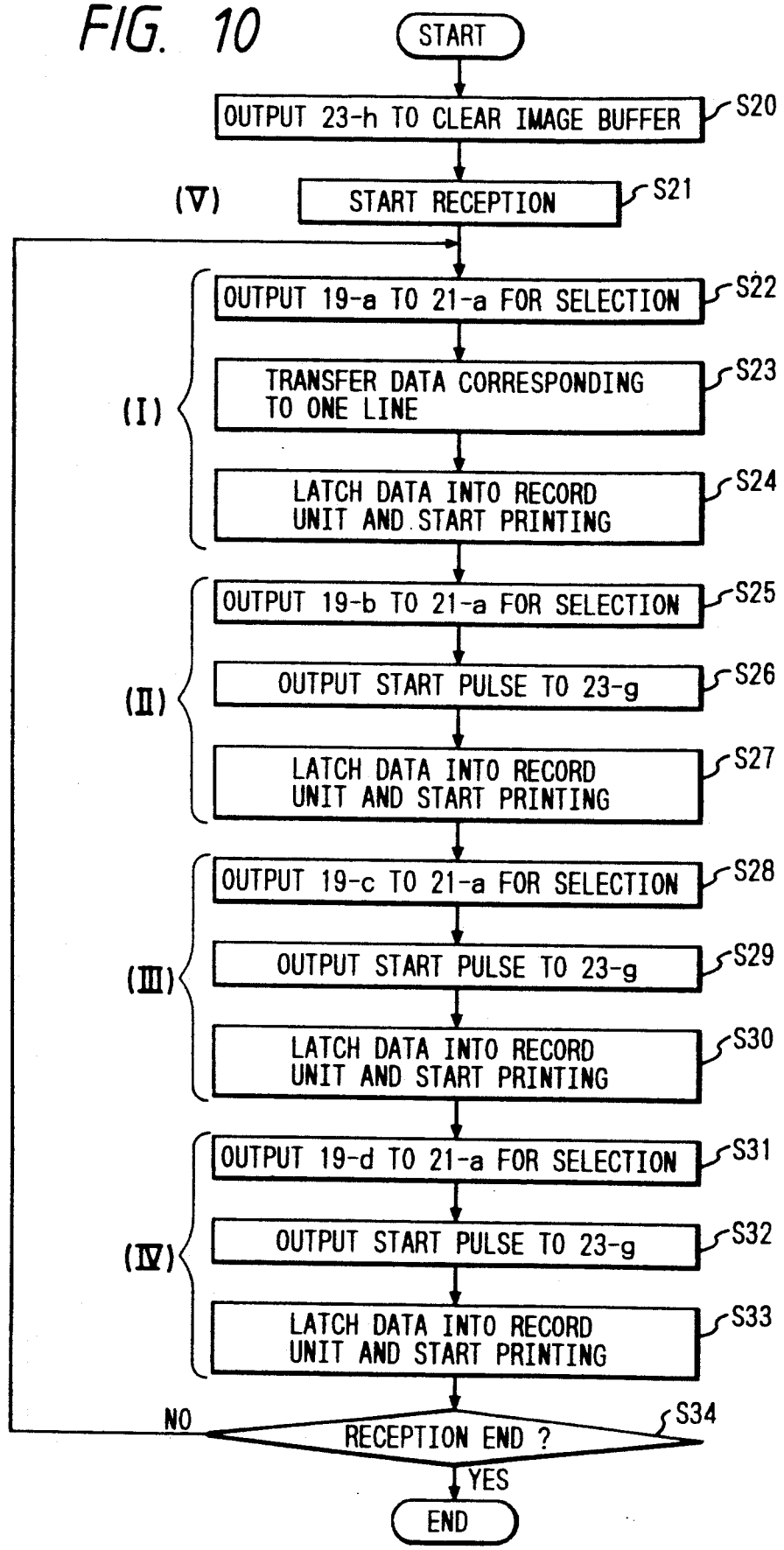

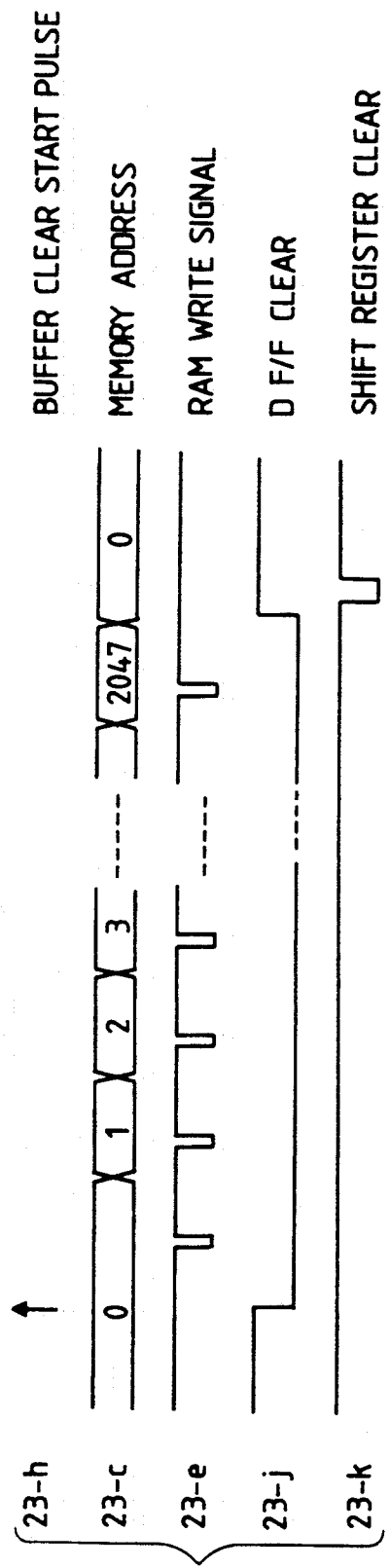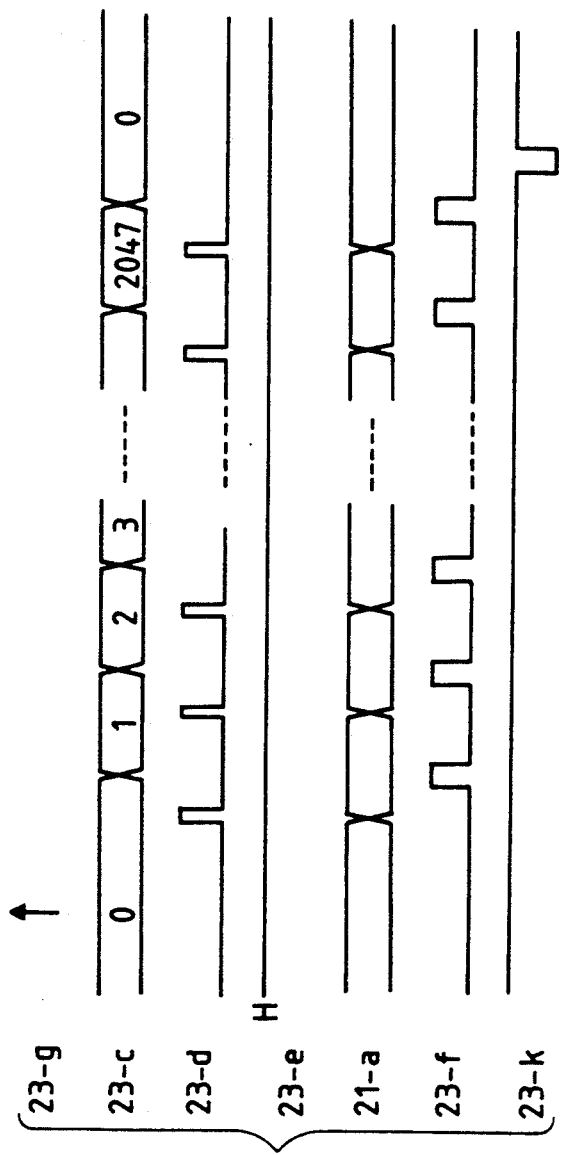

IMAGE PROCESSING APPARATUS

BACKGROUND OF THE INVENTION

1. Field of the Invention

The present invention relates to an image processing apparatus such as a facsimile apparatus and, more particularly, to an image processing apparatus for performing segmentation processing of input image data, and recording the processed image data to have high quality.

2. Related Background Art

Conventionally, a technique for performing pixel-density conversion of binary image data received by a facsimile apparatus, and segmenting the image data to perform recording, is known. As a related technique, U.S. patent application Ser. No. 599,507 (filing date: Oct. 18, 1990) has been filed.

In a conventional technique, however, since data received at, e.g., 7.7 lines/mm (fine mode) is converted to a double pixel density of 15.4 lines/mm (super fine mode) in the same processing disregarding a character image and a photographic image, when an image including both a character image and a halftone image is received, edges in the character portion are blurred, or gradation of the halftone image cannot be satisfactorily reproduced.

When one line of reception data is recorded as a plurality of segmented lines, reception image data transfer clocks corresponding in number to the plurality of lines must be input in order to perform processing of all the segmented lines, resulting in complex control procedures being required.

In this case, since a data transfer speed of the segmented lines is determined by the speed of the reception image data transfer clocks, when the reception image data transfer clocks are output simultaneously with decode processing, the decode processing takes much time, and the clock speed cannot be increased.

In a conventional apparatus for performing segmentation processing, reception data is stored in an image buffer in advance, and the reception data is then read out from the image buffer to be subjected to image processing. Since a storage operation of the reception data into the image buffer and an image interpolation processing operation are independently performed, it is difficult to realize a high-speed system.

In a conventional apparatus, the image data subjected to segmentation processing is temporarily stored in a line buffer, and is then transferred to a record unit. Therefore, a memory for storing segmented line data is an indispensable component, resulting in increases in cost and size of the apparatus. This problem becomes more serious as the number of segmented lines is increased. Since data must be temporarily stored in the line buffer, it is difficult to realize a high-speed apparatus.

SUMMARY OF THE INVENTION

The present invention has been made to eliminate the conventional drawbacks, and has as its object to provide a facsimile apparatus which can perform segmentation processing of input data by simple control at high speed and low cost.

It is another object of the present invention to provide an image processing apparatus which separates reception image data into image areas, and interpolates a character image to perform segmentation processing, so that the edge of a character portion can be smoothly reproduced, and a halftone image can also be prevented from being degraded.

It is still another object of the present invention to provide an image processing apparatus which performs segmentation processing of reception binary data on the basis of resolution information sent from a transmitter side, so that data sent from the transmitter side at a low density can be recorded and output at a high density, and a high-quality image can be reproduced.

It is still another object of the present invention to provide an image processing apparatus which has a function of performing smoothing processing on each pixel in synchronism with reception image data transfer clocks, and a function of starting processing in response to a start pulse and stopping the processing upon completion of the smoothing processing for a predetermined one main scan line, so that interpolation processing (smoothing processing) can be realized by simple control which is almost the same as that in a conventional apparatus which does not perform interpolation processing.

According to the above-mentioned arrangement, since the speed of conversion to segmented pixels during smoothing processing is not limited by the reception image data transfer clocks, high-speed processing can be realized.

It is still another object of the present invention to provide an image processing apparatus which can perform high-speed interpolation/segmentation processing since a memory write operation and the interpolation/segmentation operation are simultaneously performed in synchronism with reception image data transfer clocks.

It is still another object of the present invention to provide an image processing apparatus which does not require a memory for storing line data subjected to segmentation processing since the same reference data is repetitively read out from a single image buffer when each one line of reception data is processed into a plurality of segmented lines, so that the apparatus can be rendered compact, with reduced cost, and can realize a high-speed apparatus since it does not require an operation for temporarily storing segmented line data in a memory.

According to the present invention, data read out from an image buffer is shifted by a shift register, and is written at the same address of the image buffer, thereby shifting data serving as reference data in segmentation processing in a sub-scan direction. Therefore, the storage capacity of a buffer for storing reference data can be minimized, resulting in a compact, low-cost apparatus.

It is still another object of the present invention to provide an image processing apparatus which simultaneously clears image buffers for a plurality of lines, which buffers are required at the beginning of data reception, thereby shortening a clear operation period.

The above and other objects, features and advantages of the present invention will be apparent from the following detailed description taken in conjunction with the accompanying drawings.

BRIEF DESCRIPTION OF THE DRAWINGS

FIGS. 8 and 12 are timing charts obtained when the image processing block is operated in response to a start pulse;

FIG. 10 is a flow chart showing processing executed when image data is received and recorded;

FIG. 11 is a timing chart showing an operation for clearing a memory in response to a buffer clear start pulse;

DETAILED DESCRIPTION OF THE PREFERRED EMBODIMENTS

The preferred, embodiments of the present invention will be described in detail below with reference to the accompanying drawings.

Figure 1:
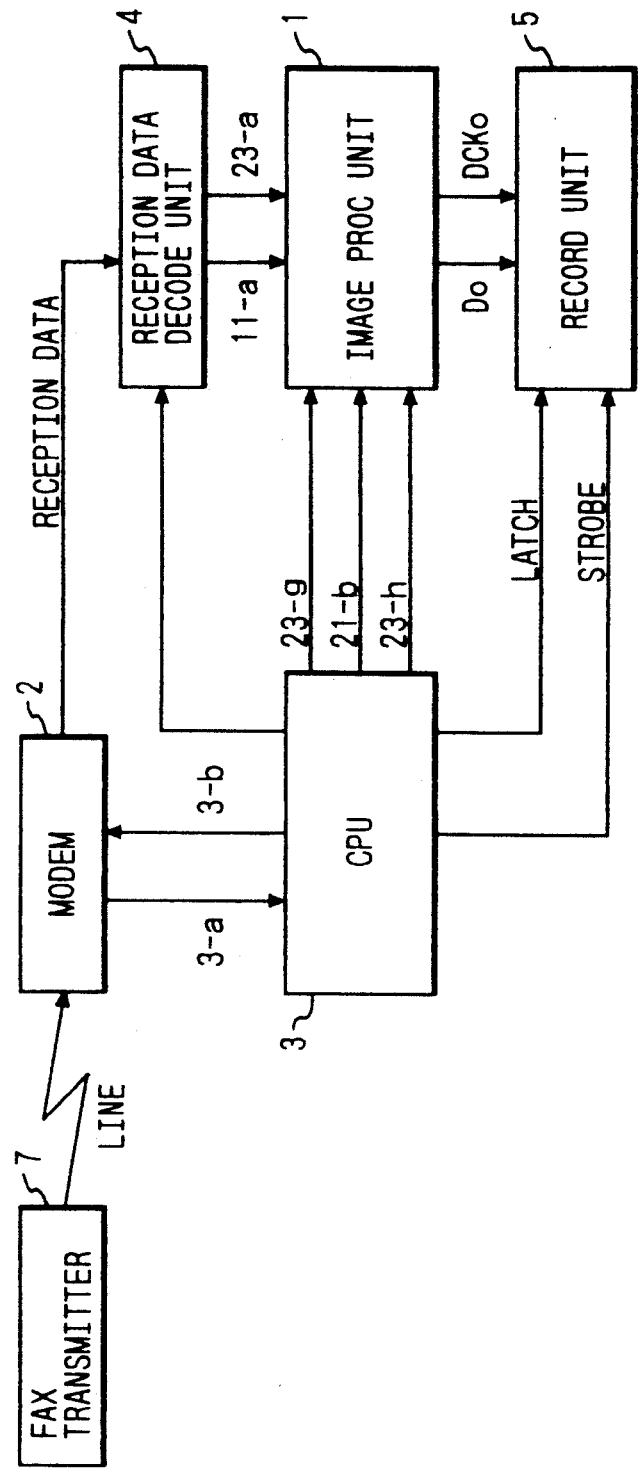
FIG. 1 is a block diagram of a facsimile apparatus according to an embodiment of the present invention.

FIG. 1 is a block diagram showing a facsimile apparatus according to an embodiment of the present invention. FIG. 1 shows blocks used in reception of data directly associated with this embodiment.

In FIG. 1, an image processing unit 1 performs segmentation processing of image data (binary data) sent from a facsimile apparatus at the transmission side, and performs interpolation (smoothing) processing of a character image. When a transmission density is designated as 3.85 lines/mm (standard mode) by a procedure signal received from the facsimile apparatus of the transmission side, the image processing unit 1 performs ×4 smoothing processing; when the transmission density is designated as 7.7 lines/mm (fine mode), it performs ×2 smoothing processing. When data is transmitted from a transmitter apparatus at 15.4 lines/mm (super fine mode), the image processing unit 1 performs neither the segmentation nor smoothing processing.

In FIG. 1, the apparatus includes a modem 2 for demodulating data on a line, a CPU 3 for controlling the entire system of this embodiment, a reception data decode unit 4 for decoding reception data sent from the modem 2, a full-multi system record unit 5 such as a thermal head printer or an ink-jet printer for recording an image on the basis of binary data sent from the image processing unit 1, and a facsimile transmitter 7. The record unit 5 receives a latch signal and a strobe signal from the CPU 3.

Signals 3-a and 3-b are exchanged between the modem and the CPU. A procedure signal representing a resolution of transmission data sent from the facsimile transmitter is sent from the modem 2 to the CPU 3 as the signal 3-a.

Signals 23-g, 21-b, and 23-h are used for transmitting various data from the CPU 3 to the image processing unit 1. A signal 23-g serves as a reference signal used when data for second and subsequent lines are to be segmented, i.e., when the image processing unit 1 segments data for one main scan line into two or four lines. A signal 21-b is used to select one of a plurality of data output from an image processing algorithm unit 19 shown in FIG. 4 (to be described later). Note that the image processing algorithm unit 19 outputs a total of seven data, i.e., four data when one pixel in one line is output as data for four lines, two data when it is output as data for two lines, and one data when no conversion is performed.

Figure 4:
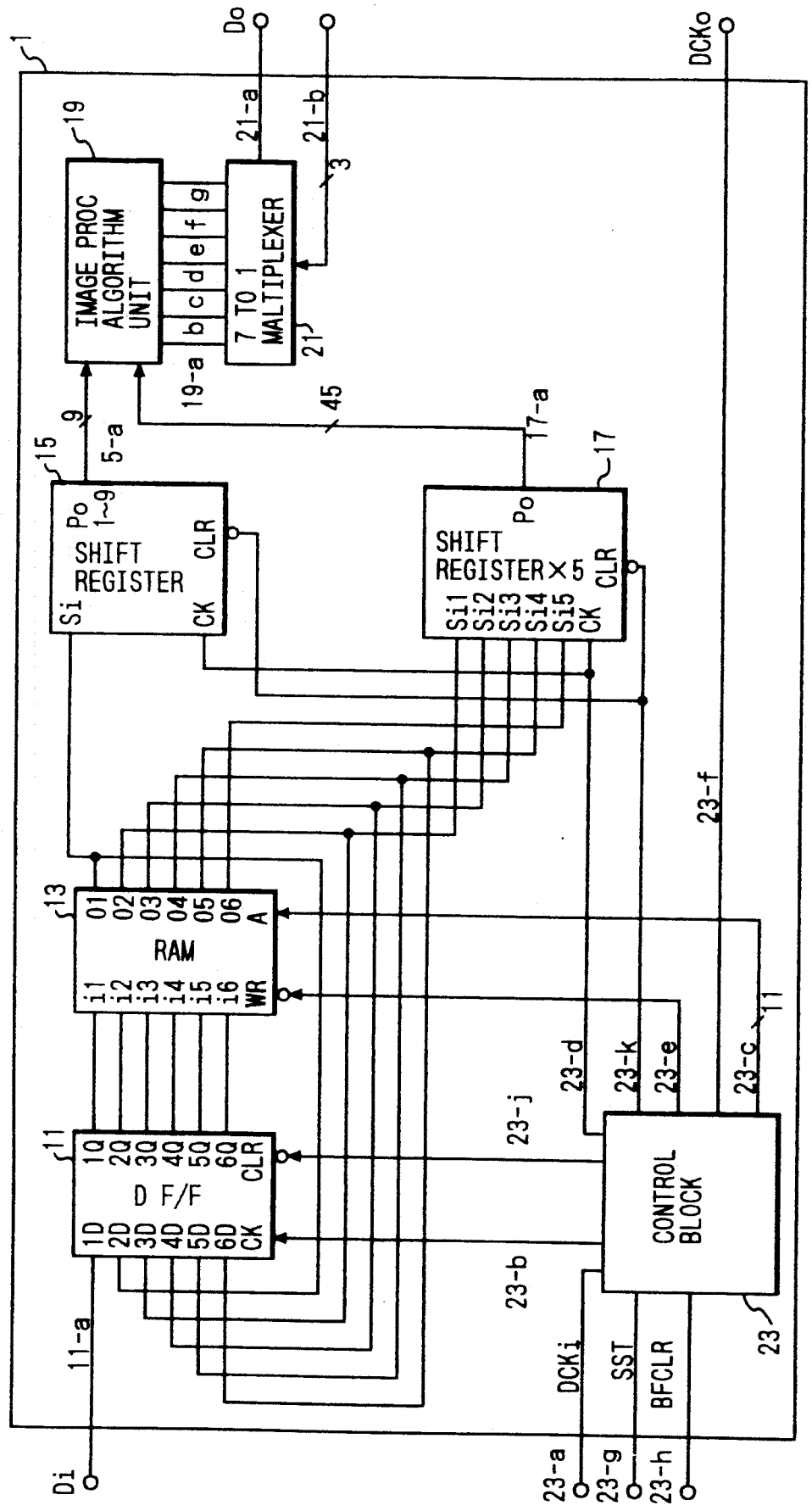
FIG. 4 is a block diagram showing in detail an image processing unit 1 shown in FIG. 1.

A buffer clear pulse 23-h is used to clear a RAM 13 used as a plurality of line memories shown in FIG. 4.

Serial image data 11-a is obtained by decoding reception data by the reception data decode unit 4, and is input to the image processing unit 1 in synchronism with a transfer clock 23-a.

Figure 2:
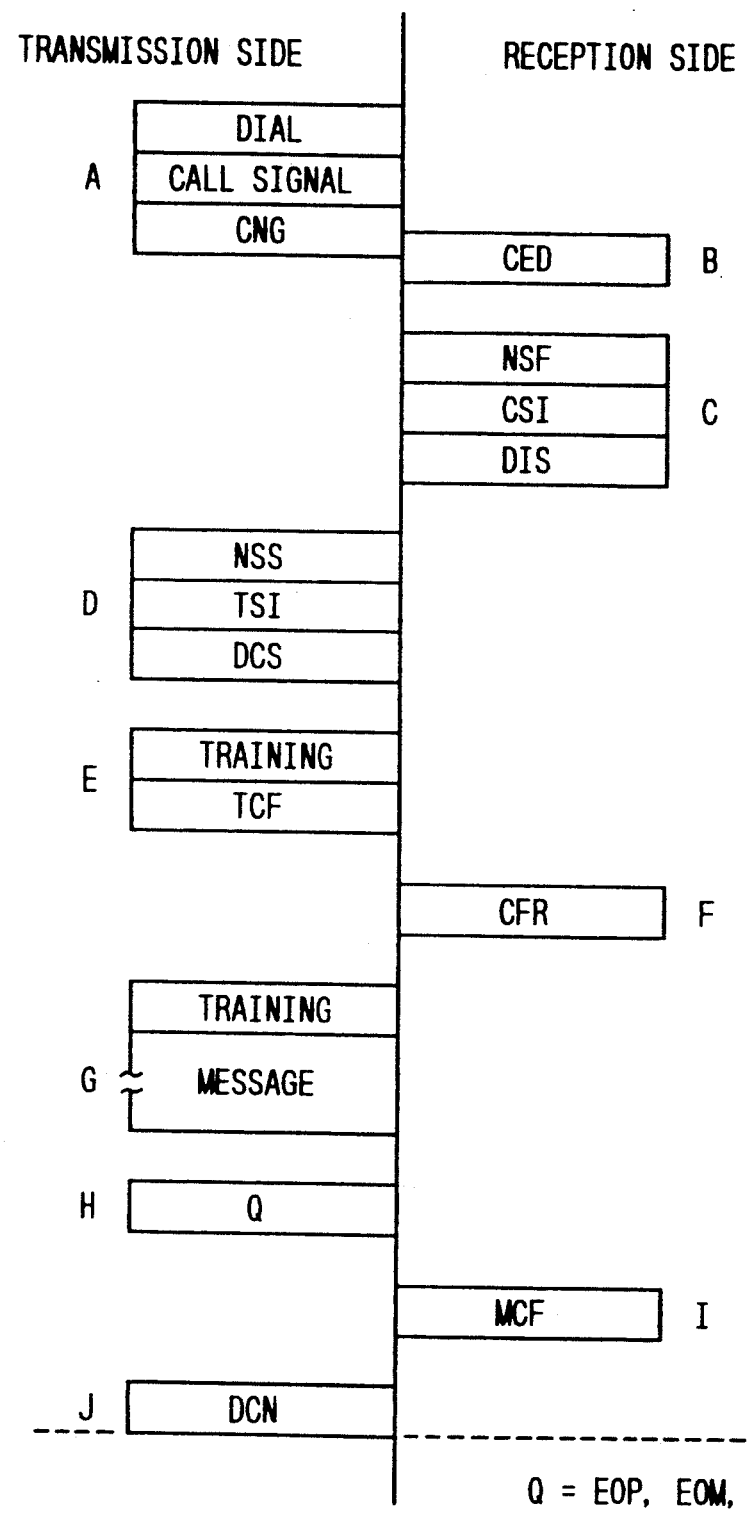
FIG. 2 is a chart showing procedure signals exchanged between facsimile apparatuses at transmission and reception sides.

FIG. 2 is a chart for explaining a flow of procedure signals exchanged between facsimile apparatuses at the transmission and reception sides.

A block A in FIG. 2 indicates procedure signals for calling the reception side, CED in a block B indicates a procedure signal indicating that a terminal at the reception side is a non-audio terminal, NSF in a block C indicates a procedure signal indicating that an apparatus at the reception side is a non-standard apparatus, CSI, indicates a procedure signal for informing the other side of, e.g., a telephone number of the reception side, and DIS indicates a procedure signal for indicating that the reception side has a CCITT standard function. Of NSS, TSI, and DSC in a block D, NSS indicates a procedure signal for responding to the signal NSF described above, TSI indicates a procedure signal for giving, e.g., a telephone number of the transmission side, and DSC indicates a procedure signal for responding to the signal DIS described above. In this embodiment, the transmission side designates using the signals NSS and DCS whether transmission data is transmitted in a standard, fine, or super fine mode. The reception side selects ×4 or ×2 pixel-density conversion, or non-conversion in accordance with the designated pixel density. TRAINING in a block E indicates a training signal, and TCF indicates a training check signal. CFR in a block F indicates a procedure signal for informing the transmission side that a pre-procedure is ended, and transmission of a message can be started. A block G represents image data. A Q signal in a block H is one of signals EOP, EOM, and MPS. When the Q signal is EOP, it is a procedure signal for indicating an end of procedure. Thus, a signal MCF (message confirmation signal) in a block I is received, and a line is disconnected in response to a signal DCN in a block J. When the Q signal is EOM (end-of-message signal), it indicates to perform transmission of the next page in a changed mode. In this case, the control returns to the procedure of the signal NSS in the block D after the signal EOM is transmitted. When the Q signal is MPS (multi-page signal), it indicates to perform transmission of the next page without changing a mode. In this case, the control returns to the message transmission procedure in the block G.

Figure 3:
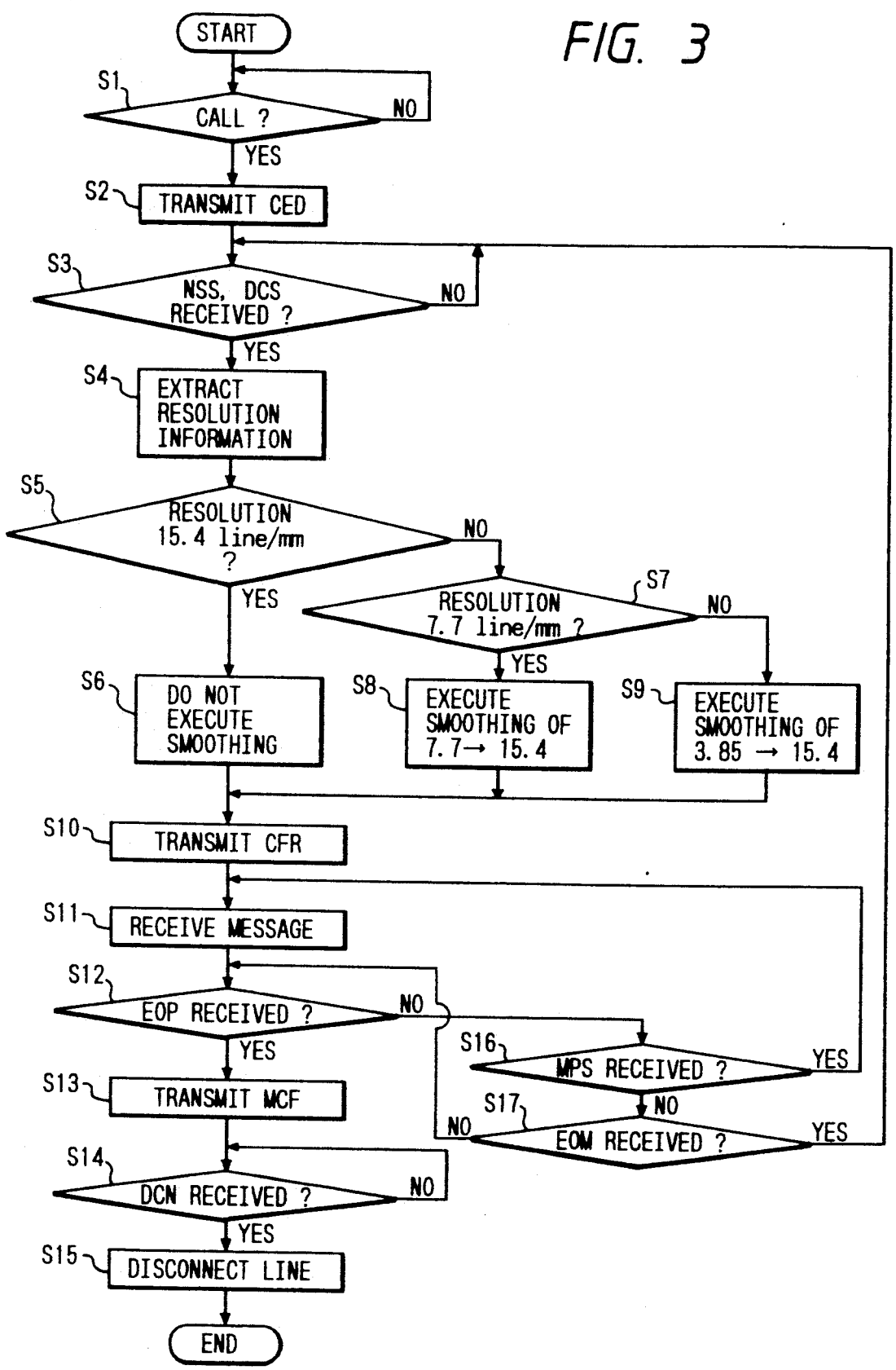
FIG. 3 is a control flow chart executed by CPU 3 shown in FIG. 1.

FIG. 3 is a flow chart showing an operation for extracting resolution information of transmission data from the signals NSS and DSC sent from the transmission side, and selecting one of a ×2 smoothing mode, a ×4 smoothing mode, and a non-smoothing mode on the basis of the extracted information. This flow chart is executed by the CPU 3 in FIG. 1. When one of the three smoothing modes is determined by the CPU 3, the selected mode is informed to the image processing unit 1 using the signal 21-b. The image processing unit 1 selects a signal from the image processing algorithm unit 19 (FIG. 4; to be described later) on the basis of the input signal.

In FIG. 3, in step S1, it is checked if a call signal from the transmission side is detected. If YES in step S1, the flow advances to step S2, and the signal CED is transmitted. When the signals NSS and DCS are received from the transmission side, the flow advances to step S4, and resolution information declared by the signals NSS and DSC is extracted. As a result, if it is determined that the resolution of 15.4 lines/mm, i.e., the super fine mode is designated, the flow advances to step S6, and smoothing processing is inhibited.

If it is determined in step S7 that the resolution of 7.7 lines/mm, i.e., the fine mode is designated, the ×2 smoothing processing from 7.7 lines/mm to 15.4 lines/mm is selected in step S8. If it is determined in step S7 that the fine mode is not designated, it is determined that the resolution of 3.85 lines/mm, i.e., the standard mode is designated, and the flow advances to step S9 to select ×4 smoothing processing from 3.85 lines/mm to 15.4 lines/mm.

The mode selected in step S6, S8, or S9 is sent to the image processing unit 1 using the signal 21-b.

In step S10, the signal CFR is transmitted, and in step S11, a message is received. If the signal EOP is received in step S12, the signal MCF is transmitted in step S13. If the signal DCN is received in step S14, the flow advances to step S15. In step S15, a line is disconnected, and processing is ended. If the signal MPS is received in step S16, the flow advances to step S11, and a message of the next page is received. If the signal EOM is received in step S17, the flow returns to step S3, and a mode signal for the next page is received based on the signals NSS and DCS. When these procedure signals include resolution information, the smoothing processing mode is switched by the processing operations in steps S4 to S9 described above.

FIG. 4 is a block diagram showing in detail the image processing unit 1. The unit 1 comprises a D-type flip/-flop (D F/F) 11 for line-shifting image information to be referred in a sub-scan direction so as to perform image processing, a RAM 13 serving as a line memory for storing 6-line information data to be referred, shift register groups 15 and 17 for bit-shifting image information to be referred, the image processing algorithm unit 19 for performing ×2 and ×4 smoothing processing operations, a multiplexer 21 for selecting image data output from the image processing algorithm unit 19 on the basis of resolution data sent from the CPU 3, and outputting the selected image data, and a control block 23 for outputting a clock signal and a clear signal for the D F/F 11, a write signal and an address signal for the RAM 13, a clock signal, a clear signal, and a data clock for the shift registers 15 and 17, and the like.

Interpolation processing (smoothing processing) of a record system in the above arrangement will be described below. In a facsimile transmission/reception operation, when a maximum density of a sub-scan line in a recording operation at the reception side is higher than a scanning line density of transmission data from the transmission side, for example, when a transmitter transmits data in the standard mode, and a receiver performs recording in the super fine mode, one pixel of data is segmented into four segments. The segmented pixel data is determined in accordance with data around a pixel of interest.

Information of a line density from the transmission side is stated in the signals NSS and DCS described above with reference to FIGS. 2 and 3.

Figure 5:
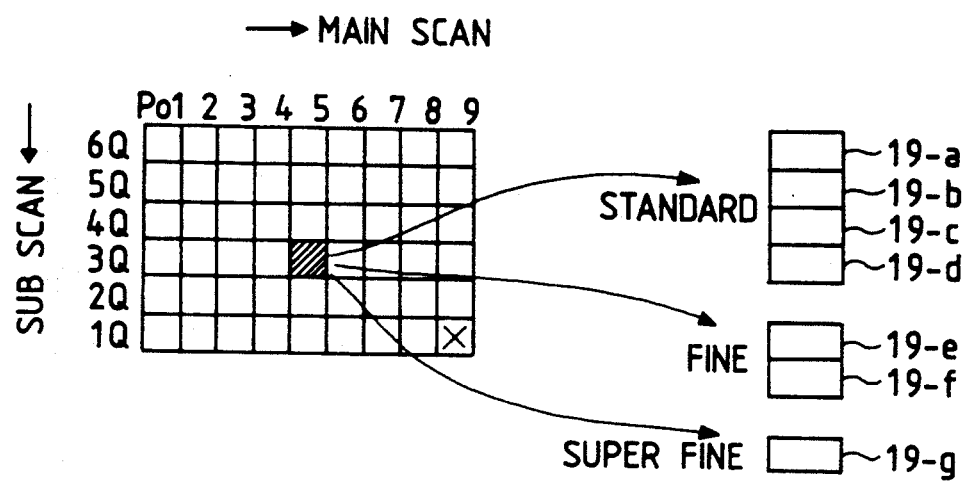
FIG. 5 is a view showing a state of segmentation when segmentation processing and interpolation processing are performed, and a reference pixel area when interpolation processing is performed.

FIG. 5 is a view showing an example for segmenting one-pixel reception data.

In FIG. 5, when data is sent from the transmission side in the standard mode for a pixel of interest indicated by hatching, the pixel is segmented into four pixels 19-a to 19-d. When data is sent in the fine mode, the pixel is segmented into two pixels 19-e and 19-f. When the data is sent in the super fine mode, non-segmented data 19-g is selected. In order to determine the segmented pixel data, a reference area for 6 lines×9 pixels is used.

In this embodiment, area separation of a character and a halftone image is performed based on binary image data for 6 lines×9 pixels, and smoothing processing is executed for only the character. For the halftone image, the same data as reception data is output as a segmented pixel.

Figure 6A:
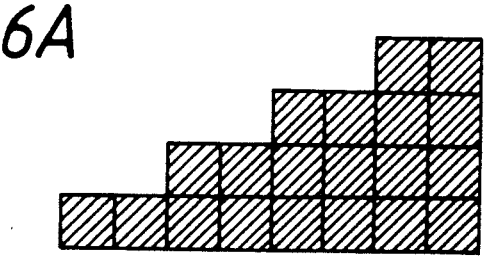
FIGS. 6A and 6B are views showing outputs when the segmentation processing and interpolation processing are performed.
Figure 6B:
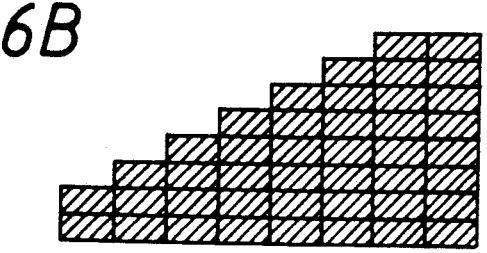

FIGS. 6A and 6B are views for explaining cases wherein reception data is subjected to ×2 smoothing processing in the sub-scan direction.

FIG. 6A shows received binary data, and FIG. 6B shows data subjected to the ×2 smoothing processing in the sub-scan direction. Thus, a smooth image which is free from steps at an edge portion can be reproduced. When smoothing processing of a pixel indicated by hatching in FIG. 5 is to be performed, binary data of the two pixels 19-e and 19-f are determined using binary image data for 6 lines×9 pixels as reference pixels. In FIG. 4, received serial data Di is input as the signal 11-a in synchronism with a clock from the decode unit 4.

Figure 7:
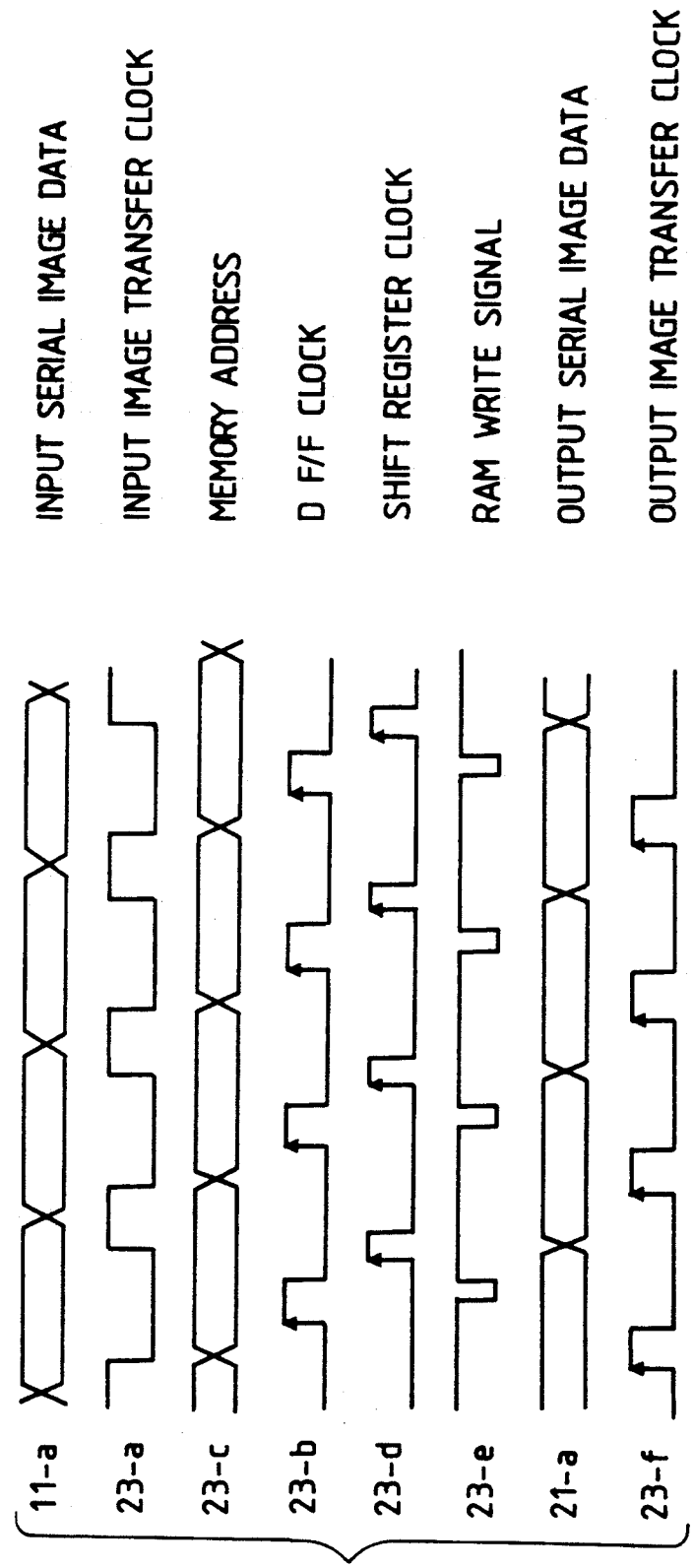
FIG. 7 is a timing chart obtained when an image processing block is operated in synchronism with input image transfer clocks.

As shown in FIG. 7, the data is latched by a terminal 1Q of the D F/F 11 in response to the clock 23-b, and at the same time, data at terminals O1 to O5 of the RAM 13 at an address at that time are latched by terminals 2Q to 6Q. The data latched by the terminals 1Q to 6Q of the D F/F 11 are input to terminals i1 to i6 in a data input section of the RAM 13, and are written therein in response to a WR signal 23-e. Paying attention to the data written in the RAM 13 at that time, data to be written in the terminal i1 is serial image data, and data to be written in the terminal i2 is image data read out from the terminal O1 and located at the same address in an immediately preceding line. Similarly, data in a line two lines ahead of the present line is written in the terminal i3, . . . , data in a line five lines ahead of the present line is written in the terminal i6. More specifically, data in the RAM are read out and written while being shifted bit by bit, as described above, so that the reference data area can be shifted by one line in the sub-scan direction.

The data at the terminals O1 to O6 of the RAM 13 are shifted to the shift registers 15 and 17. The shifted data correspond to 1Q to 6Q in a column $P_0 9$ in FIG. 5.

The reference data area can be shifted in the main scan direction by inputting a shift register clock 23-d synchronized with input serial image data to the shift registers 15 and 17.

The reference data (6×9=54 pixels in FIG. 5) prepared as described above are input to the image processing algorithm unit 19. The image processing algorithm unit 19 simultaneously outputs interpolated pixel data 19-a to 19-g on the basis of the input reference data. Pixel data 19-a to 19-d are those obtained when one pixel is segmented into four pixels (reception in the standard mode, and recording in the super fine mode), pixel data 19-e and 19-f are those obtained when one pixel is segmented into two pixels, and pixel data 19-g is one obtained when no segmentation is performed (in this case, no interpolation is performed, and pixel of interest data is directly output).

A main scan operation is then performed several times for received pixel data for one main scan line, and segmented pixels are recorded. In this case, a case will be exemplified below wherein data is received in the standard mode, and four segmented pixels are recorded in the super fine mode. Received pixel data for one main scan line are written in the RAM 13 while being shifted in the sub-scan direction in accordance with the timing chart shown in FIG. 7, and at the same time, data read out from the RAM 13 are used to prepare for reference image data. The reference image data are input to the image processing algorithm unit 19. The image processing algorithm unit 19 outputs segmented image data 19-a to 19-g. The output data are selected by switching the select signal 21-b for the multiplexer 21 in accordance with resolution information from the transmission side, and the selected data are transferred to the record unit to be subjected to recording. As shown in FIG. 7, segmented image data 21-a for the first line is output in real time every time one-pixel data is input. The multiplexer 21 selects data 19-a for the first segmented line (standard mode→super fine mode), and sequentially selects 19-b, 19-c, and 19-d for the second and subsequent lines to perform recording. In consideration of recording of segmented lines, since the data 19-a to 19-d corresponding to received one pixel must be obtained using the same reference image data, the sub-scan shift operation of the image data described above is inhibited when the second to fourth segmented lines are recorded. That is, the data stored in the RAM is repeatedly used to output the second to fourth segmented lines.

Figure 8:
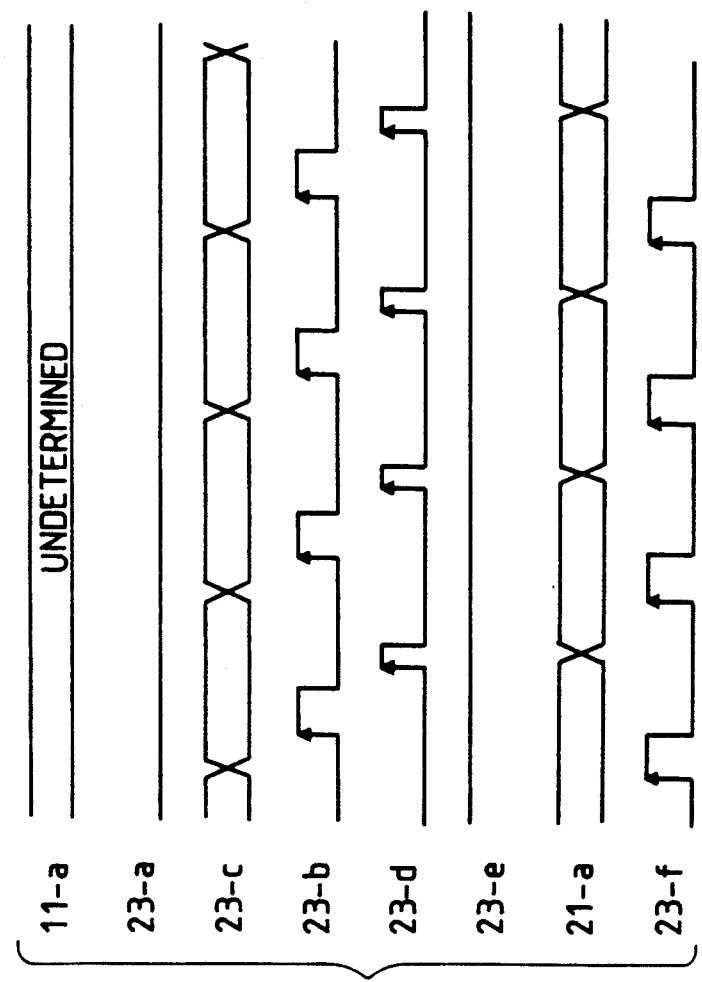

FIG. 7 illustrates the timing chart used when segmented image data for the first line is output. FIG. 8 shows the timing chart used when segmented image data for the second to fourth lines are to be output. In this case, since image data already input to the RAM 13 can be used as the reference image data, the input serial image data 11-a, the input image transfer clock 23-a, and the write signal 23-e to the RAM 13 can be omitted.

Figure 9:
FIG. 9 is a timing chart obtained when four segmented pixel processing operations of reception image data are performed to record the image data.

FIG. 9 is a timing chart summarizing the operations in FIGS. 7 and 8.

As can be seen from FIG. 9, segmented image data for the first line is output as data 19-a from the line 21-b in accordance with the input serial image data 11-a, and segmented image data for the second to fourth lines are output as data 19-b, 19-c, and 19-d in accordance with the start pulse 23-g from the CPU 3.

More specifically, the control block 23 generates clocks for one main scan period on the basis of the start pulse 23-g, so that output serial image data 21-a and an output image transfer clock 23-f can be output. Note that "latch" in FIG. 9 represents a data latch operation in a shift register of a thermal head, and "record" represents a strobe signal of the thermal head.

FIG. 10 is a flow chart showing processing executed when image data is received and recorded. FIG. 10 exemplifies a case wherein data received at a resolution of the standard mode is recorded in the super fine mode.

In FIG. 10, steps designated by symbols (I) to (IV) correspond to periods (I) to (IV) in FIG. 9, and a step designated by (V) in FIG. 10 corresponds to a timing chart shown in FIG. 11.

In step S20, the RAM 13 (line buffers for six lines) is cleared when reception of image data is started.

Referring to FIG. 11, the CPU 3 outputs a buffer clear pulse 23-h to the control block 23. The control block 23 clears the D F/F 11 in response to a D F/F clear pulse 23-j, and writes the clear signal in the RAM 13 in response to a RAM write signal 23-e.

When a shift register clear pulse 23-k is set at high level for a one-line interval, buffers for a plurality of lines (six lines) are cleared at the same time. Thus, a clear time can be greatly shortened as compared to a case wherein the buffers are cleared by addressing the RAM in units of lines.

In step S21, data 11-a sent from the decode unit 4 is received. At this time, the address of the memory is controlled so that data for the first line is stored in the last line of the RAM 13.

More specifically, since input image data for the first and second lines are stored in the fifth and sixth lines of the RAM 13, output image data 21-a at this time becomes 0 since data in lines before the pixel of interest (hatched pixel in FIG. 5) are cleared in step S20. In this manner, generation of unnecessary dots caused by holding previous reception data can be prevented. Output data is segmented pixel data for the pixel of interest in a line two lines ahead of the present line with respect to input image data. Since segmentation processing can be performed in real time, processing speed can be decreased.

Steps S22 to S24 correspond to the period (I) in FIG. 9 described above. Segmentation processing of the input image data 11-a is performed in real time. Steps S25 to S27 correspond to the period (II) in FIG. 9, and segmentation processing for the second line is performed. Similarly, in steps S28 to S30, segmentation processing for the third line is performed, and in steps S31 to S33, segmentation processing for the fourth line is performed.

In this manner, since segmentation processing is performed in response to the start pulse 23-g from the CPU 3 for the second and subsequent lines, control for the processing can be simplified, and high-speed processing can be performed.

FIG. 12 shows the timing chart when the start pulse 23-g is input, and illustrates in detail the period (II) in FIG. 9. Upon reception of the start pulse 23-g from the CPU 3, the control block 23 sequentially sends address signals 23-c to the RAM 13, and sends a clock 23-d to the shift registers 15 and 17, so that 6×9 pixels are sequentially shifted and transferred to the image processing algorithm unit 19. The multiplexer 21 selects one of data output from the image processing algorithm unit 19, and outputs output image data 21-a in accordance with the output image transfer clock 23-f. A clear pulse 23-k is used to clear 6×9 pixel data when segmentation processing for the next line is performed after segmentation processing for a given line is completed, and is input to the shift registers 15 and 17. When segmentation processing for the second, third, and fourth lines is to be performed, since 6×9 pixel data used in processing of the immediately preceding line are cleared in response to the clear pulse, generation of noise can be prevented.

Figure 13:
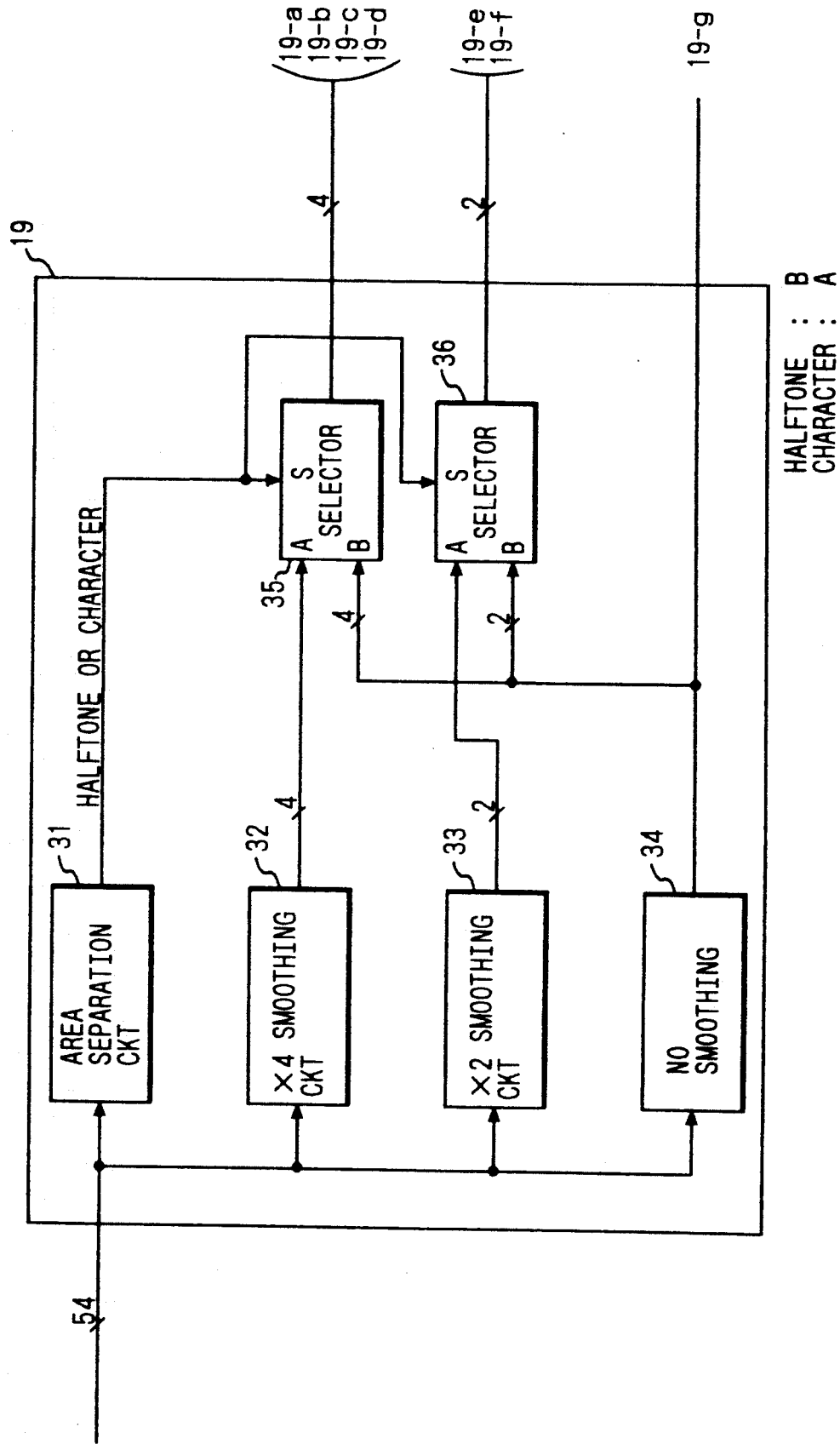
FIG. 13 is a block diagram showing in detail image processing algorithm unit 19 shown in FIG. 4.

FIG. 13 is a block diagram showing in detail the image processing algorithm unit 19 shown in FIG. 4.

An area separation circuit 31 discriminates on the basis of input binary image data (6×9=54 pixels) whether a pixel of interest is present in a character area or a photograph area. Discrimination is performed on the basis of a combination of a spatial frequency, periodicity, and pixel isolation of binary data in a 6×9 block.

In discrimination based on the spatial frequency, the numbers of reversals of a density in the main and sub-scan directions are obtained, and a total sum of the numbers of reversals is compared with a predetermined threshold value. If the sum is larger than the threshold value, the pixel of interest is determined as a halftone pixel; if it is smaller than the threshold value, the pixel is determined as a character pixel.

Discrimination based on the periodicity is effective for discriminating an area of a dither-processed image from the transmission side. In this case, assuming that image data is dither-processed using a 4×4 dither matrix in the transmission side, the 6×9=54 pixels are divided into 4×4 matrices (a given matrix includes only some of 4×4 pixels), and the number of coincidences of corresponding pixels in the plurality of 4×4 matrices is checked. If this number is large, the pixel of interest is determined as a halftone pixel; if it is small, the pixel is determined to be a character pixel.

Discrimination based on the pixel isolation is effective for discriminating an area of a halftone-processed image by an error diffusion method in the transmission side. In this case, for each black pixel of 6×9=54 pixels, it is checked if there are vertically and horizontally adjacent black pixels. If there are no vertically and horizontally adjacent black pixels with respect to a given black pixel, the pixel is determined to be an isolation pixel.

If the number of isolation pixels is larger than a predetermined threshold value, the pixel of interest is determined to be a halftone pixel; if it is smaller than the threshold value, the pixel is determined to be a character pixel.

The area separation circuit 31 accepts a majority decision of these three discrimination results to discriminate if the pixel of interest is a halftone or character pixel, and sends the discrimination result to selectors 35 and 36. Note that the area separation circuit 31 comprises a ROM for outputting an area separation result using data for 6×9=54 pixels as address signals.

A ×4 smoothing circuit 32 is a circuit for performing ×4 segmentation processing of data of the pixel of interest in the sub-scan direction, and a ×2 smoothing circuit 33 is a circuit for performing ×2 segmentation processing of data of the pixel of interest in the sub-scan direction. A circuit 34 directly outputs data of the pixel of interest without performing smoothing processing.

Each of the ×4 smoothing circuit 32, the ×2 smoothing circuit 33, and the no smoothing circuit 34 comprises a ROM for outputting a smoothing result using 54 pixel data as address signals.

The selectors 35 and 36 select data output from the smoothing circuit 32 or 33, or data output from the no smoothing circuit 34 in accordance with an area separation result from the area separation circuit 31.

If the area separation circuit 31 determines that the area of the pixel of interest is a halftone area, the selector 35 outputs 4-bit data from the no smoothing circuit 34 as the data 19-a to 19-d; if the circuit 31 determines that the area is a character area, the selector 35 outputs 4-bit data from the ×4 smoothing circuit 32 as the data 19-a to 19-d.

If the area separation circuit 31 determines that the area of the pixel of interest is a halftone area, the selector 36 outputs 2-bit data from the no smoothing circuit 34 as the data 19-e and 19-f; if the circuit 31 determines that the area is a character area, the selector 36 outputs 2-bit data from the ×2 smoothing circuit 33 as the data 19-e and 19-f.

In this manner, according to this embodiment, since smoothing processing, i.e., segmentation and interpolation processing is performed for a pixel which is determined as a character as a result of area separation, a smooth character free from an uneven character edge portion can be reproduced. Since no smoothing processing is performed for a halftone image such as a photograph, an image which is free from degradation of image quality and has high gradation precision can be reproduced.

The data 19-a to 19-g output from the image processing algorithm unit 19 are sent to the multiplexer 21. The multiplexer 21 selects and outputs data from one of the selectors 35 and 36, and the no smoothing circuit 34 on the basis of a procedure signal sent from the transmission side.

Figure 14:
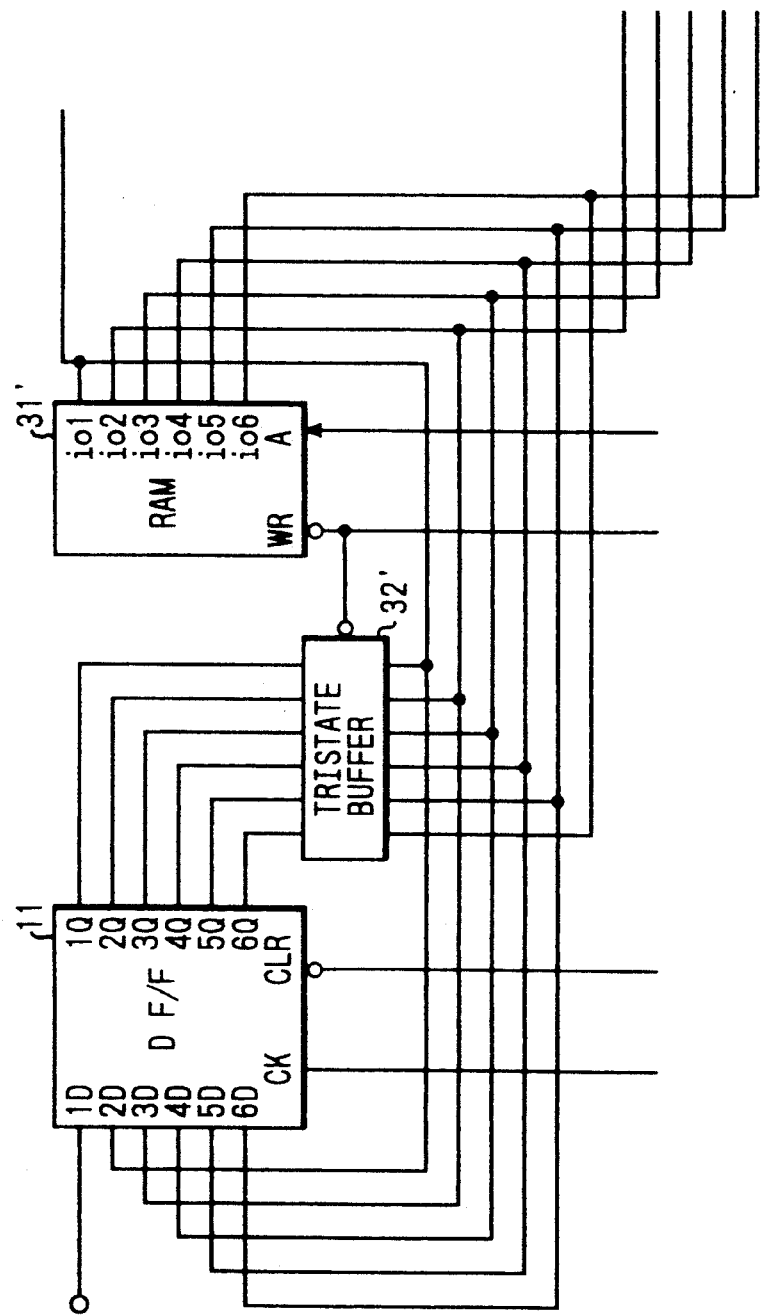
FIG. 14 is a block diagram showing a partial modification of FIG. 4.

FIG. 14 shows a partial modification of the RAM 13 in FIG. 4. In this case, the RAM 13 is replaced with a RAM having bidirectional input/output terminals. The arrangement shown in FIG. 14 includes a tristate buffer 32' having an output mode in a high-impedance state, and a RAM 31' having bidirectional input/output terminals.

In the arrangement shown in FIG. 14, outputs from the D F/F 11 are input to the tristate buffer, and outputs from the tristate buffer are input to the input/output terminals of the RAM 31' only when a memory write pulse is at Low level, thus performing the same processing as in FIG. 4.

As described above, according to this embodiment, since segmentation processing of received binary data is performed on the basis of resolution information sent from the transmission side, data sent at a low density can be recorded and output at a high density, and a high-quality image can be reproduced.

Since smoothing processing is performed only for a pixel which is determined as a character as a result of area separation of received binary data, a halftone image can be prevented from being degraded.

According to this embodiment, since the apparatus has a function of performing smoothing processing of each pixel in synchronism with reception image data transfer clocks, and a function of starting processing in response to a start pulse and stopping the processing upon completion of the smoothing processing for a predetermined one main scan line, interpolation processing (smoothing processing) can be realized by simple control which is almost the same as that in a conventional apparatus which does not perform interpolation processing.

Since a processing speed of conversion to the segmented pixels in the smoothing processing is not limited by the reception image data transfer clocks, high-speed processing can be performed.

According to this embodiment, since a memory write operation and an interpolation/segmentation operation are simultaneously performed in synchronism with the reception image data transfer clock, interpolation/segmentation processing can be performed at high speed.

A memory for storing line data subjected to segmentation processing can be omitted since the same reference data is repetitively read out from a single image buffer when each one line of reception data is processed into a plurality of segmented lines. Thus, the apparatus can be rendered compact at low cost. In addition, a high-speed apparatus can be realized since an operation for temporarily storing segmented line data in a memory can be omitted.

According to this embodiment, data read out from an image buffer (RAM 13) is shifted by a shift register, and is written at the same address of the image buffer, thereby shifting data serving as reference data in segmentation processing in a sub-scan direction. Therefore, the storage capacity of a buffer for storing reference data can be minimized, resulting in a compact, low-cost apparatus.

Since image buffers for a plurality of lines, which buffers are required at the beginning of data reception, can be simultaneously cleared, a clear operation period can be shortened.

In this embodiment, a facsimile apparatus has been exemplified as an image processing apparatus. The present invention can be applied to printers such as a laser beam printer, an ink-jet printer, and the like.

The preferred embodiment of the present invention has been described. However, the present invention is not limited to the above embodiment, and various changes and modifications may be made within the scope of the appended claims.

What is claimed is:

1. An image processing apparatus comprising:
   reception means for receiving image data sent from a transmission-side apparatus;
   discrimination means for discriminating whether the image data received by said reception means is a character image or a halftone image; and
   processing means for performing segmentation processing of the received data;
   wherein when said discrimination means discriminates that the received image data is a character image, said processing means performs smoothing processing on the basis of received image data in a predetermined area to perform segmentation processing of image data of a pixel of interest, and
   when said discrimination means discriminates that the received image data is a halftone image, said processing means performs segmentation processing of the image data of the pixel of interest without performing smoothing processing.

2. An apparatus according to claim 1, wherein said reception means receives binary image data sent from the transmission-side apparatus, and said discrimination means discriminates based on the binary image data whether image data of the pixel of interest is a character image or a halftone image.

3. An apparatus according to claim 2, wherein said discrimination means discriminates based on a spatial frequency, periodicity, and isolation of the binary image data whether image data of the pixel of interest is a character image or a halftone image.

4. An apparatus according to claim 1, wherein said processing means performs ×2 and ×4 segmentation processing operations of the reception data.

5. An apparatus according to claim 4, further comprising selection means for selecting image data which are subjected to the ×2 and ×4 segmentation processing operations by said processing means in accordance with a resolution of the image data informed from the transmission-side apparatus.

6. An image processing apparatus comprising:
   input means for inputting image data; and
   processing means for segmenting the input image data into a plurality of image data,
   wherein said processing means has a function of performing segmentation processing of each pixel in synchronism with the input reception image data transfer clock, and a function of performing the segmentation processing of a plurality of pixels in accordance with a start pulse.

7. An apparatus according to claim 6, further comprising discrimination means for discriminating on the basis of the input image data whether an image is a character image or a halftone image, and wherein said processing means performs the segmentation processing of an image which is discriminated as a character image while executing interpolation processing.

8. An apparatus according to claim 6, wherein said input means inputs binary image data sent from a transmission-side apparatus.

9. An apparatus according to claim 8, wherein said processing means performs ×2 and ×4 segmentation processing operations of the reception data.

10. An apparatus according to claim 9, further comprising selection means for selecting image data which are subjected to the ×2 and ×4 segmentation processing operations by said processing means in accordance with a resolution of the image data informed from the transmission-side apparatus.

11. An image processing apparatus comprising:
    input means for inputting image data;
    storage means for storing the input image data for a plurality of lines; and
    processing means for segmenting one-line image data stored in said storage means into image data for a plurality of first to nth segmented lines on the basis of the image data for the plurality of lines,
    wherein said processing means sequentially performs segmentation processing of second to nth segmented lines using the same image data for the plurality of lines stored in said storage means after the segmentation processing of the first segmented line.

12. An apparatus according to claim 11, further comprising control means for shifting image data read out from said storage means in a sub-scan direction, and then writing the shifted image data at same address positions in a main scan direction of said storage means, thereby moving an area of reference image data required in the segmentation processing in the sub-scan direction.

13. An apparatus according to claim 11, further comprising clear means for simultaneously clearing image data for a plurality of lines stored in said storage means during one scan period before segmentation processing by said processing means.

14. An apparatus according to claim 11, further comprising discrimination means for discriminating on a basis of an input image data whether an image is a character image or a halftone image, and wherein said processing means performs the segmentation processing of an image which is discriminated as a character image while executing interpolation processing.

15. An apparatus according to claim 11, wherein said input means inputs binary image data sent from a transmission-side apparatus.

16. An apparatus according to claim 15, wherein said processing means segments one-line image data into image data for two and four lines.

17. An image processing apparatus comprising:
input means for inputting image data;
storage means for storing the input image data for a plurality of lines;
processing means for segmenting one line of image data stored in said storage means into image data for a plurality of first to nth segmented lines, said processing means segmenting one line of image data into image data for two and four lines;
selection means for selecting the image data segmented into two and four lines by said processing means in accordance with a resolution of image data informed from the transmission-side apparatus; and
control means for controlling write access of image data to said storage means, and said processing means,
wherein said control means causes said storage means to store one line of image data input by said input means, and causes said processing means to perform conversion processing to the first segmented line.

18. An apparatus according to claim 17, further comprising discrimination means for discriminating on a basis of an input image data whether an image is a character image or a halftone image, and wherein said processing means performs the segmentation processing of an image which is discriminated as a character image while executing interpolation processing.

19. An apparatus according to claim 17, wherein said input means inputs binary image data sent from a transmission-side apparatus.

20. An apparatus according to claim 19, wherein said processing means segments one-line image data into image data for two and four lines.

21. An image processing apparatus comprising:
reception means for receiving image data sent from a transmission-side apparatus;
discrimination means for discriminating whether the image data received by said reception means is a character image or a halftone image;
processing means for performing segmentation processing of the received image data, said processing means performing ×2 and ×4 segmentation processing operations on the received image data; and
selection means for selecting image data which are subjected to the ×2 and ×4 segmentation processing operations by said processing means in accordance with a resolution of the image data informed from the transmission-side apparatus;
wherein when said discrimination means discriminates that the received image data is a character image, said processing means performs interpolation processing on the basis of reception image data in a predetermined area to perform segmentation processing of image data of a pixel of interest.

22. An image processing apparatus comprising:
input means for inputting image data;
storage means for storing the input image data for a plurality of lines;
processing means for segmenting one line of image data stored in said storage means into image data for a plurality of first to nth segmented lines;
control means for controlling write access of image data to said storage means, and said processing means,
wherein said control means causes said storage means to store one line of image data input by said input means, and causes said processing means to perform conversion processing on the first segmented line;
clear means for simultaneously clearing image data for a plurality of lines stored in said storage means during one scan period before segmentation processing by said processing means; and
second control means for shifting image data read out from said storage means in a sub-scan direction, and then writing the shifted image data at same address positions in a main scan direction of said storage means, thereby moving an area of reference image data required in the segmentation processing in the sub-scan direction.

23. An image processing apparatus comprising:
input means for inputting image data;
storage means for storing the input image data for a plurality of lines;
processing means for segmenting one line of image data stored in said storage means into image data for a plurality of first of nth segmented lines;
control means for controlling write access of image data to said storage means, and said processing means,
wherein said control means causes said storage means to store one line of image data input by said input means, and causes said processing means to perform conversion processing on the first segmented line; and
clear means for simultaneously clearing image data for a plurality of lines stored in said storage means during one scan period before segmentation processing by said processing means.

* * * * *

UNITED STATES PATENT AND TRADEMARK OFFICE
CERTIFICATE OF CORRECTION

PATENT NO. : 5,235,436

DATED : August 10, 1993

INVENTOR(S) : MASAHIRO SAKAMOTO ET AL.          Page 1 of 2

It is certified that error appears in the above-identified patent and that said Letters Patent is hereby corrected as shown below:

On the title page, item
[56] REFERENCES CITED

U.S. Patent Documents, insert
```
--4,686,579   8/87   Sakamoto............358/282
  4,903,143   2/90   Sakamoto............358/457
  4,975,786  12/90   Katayama, et al.....358/459--.
```

AT [57] ABSTRACT

Line 4, "image" should read --image.--.
Line 5, "segmentation" should read --Segmentation--.

SHEET 4 OF 12

FIG. 4, "MALTIPLEXER" should read --MULTIPLEXER--.

COLUMN 3

Line 36, "preferred," should read --preferred--.

COLUMN 11

Line 41, "data;" should read --data,--.

COLUMN 12

Line 11, "reception" should be deleted.

UNITED STATES PATENT AND TRADEMARK OFFICE
CERTIFICATE OF CORRECTION

PATENT NO. : 5,235,436
DATED : August 10, 1993
INVENTOR(S) : MASAHIRO SAKAMOTO ET AL.   Page 2 of 2

It is certified that error appears in the above-identified patent and that said Letters Patent is hereby corrected as shown below:

COLUMN 14

Line 2, "apparatus;" should read --apparatus,--.

Signed and Sealed this

Tenth Day of January, 1995

Attest:

BRUCE LEHMAN

Attesting Officer          Commissioner of Patents and Trademarks